Oct. 24, 1933.   H. M. PFLAGER   1,932,023
MOLDING APPARATUS
Filed Feb. 19, 1930   4 Sheets-Sheet 1
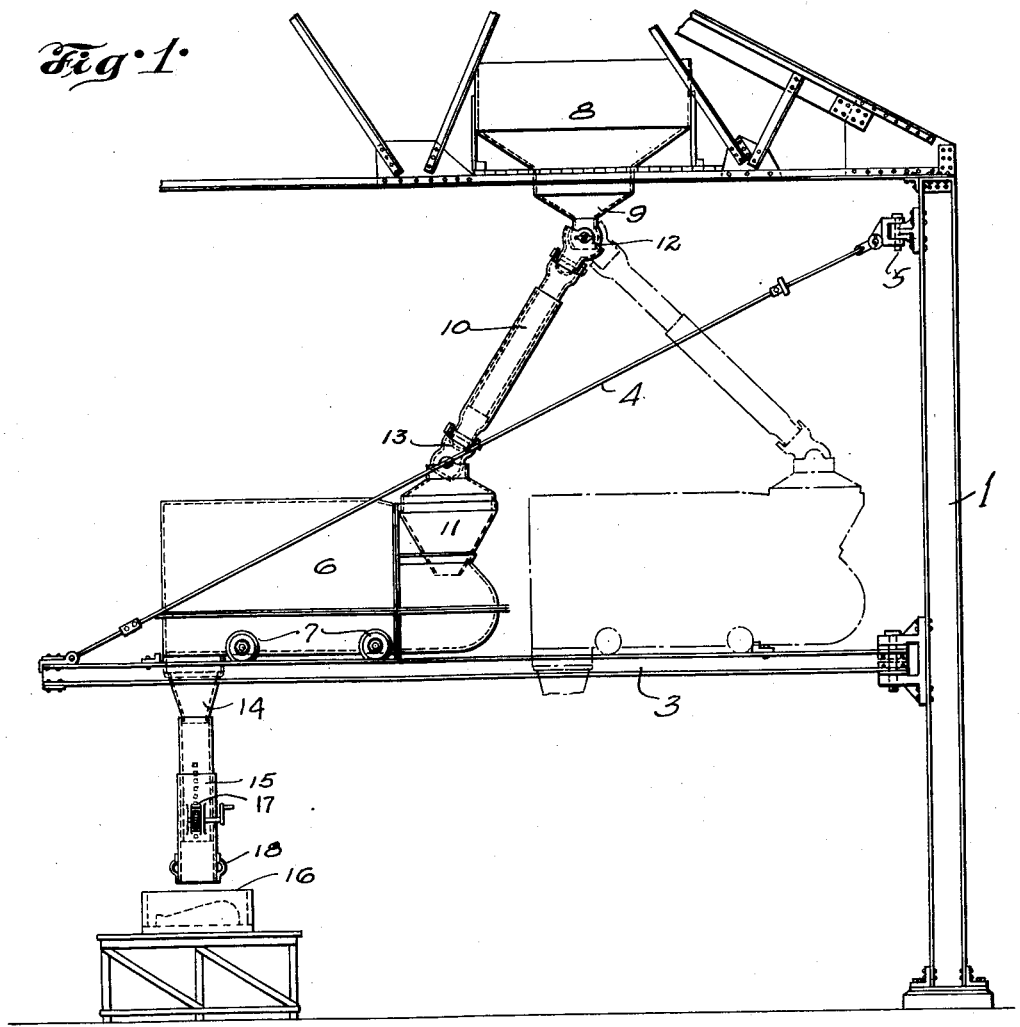
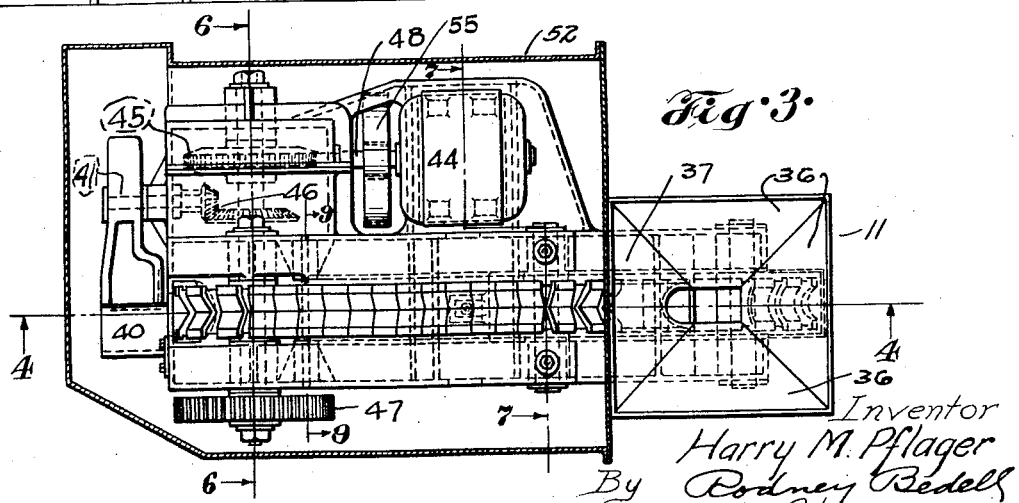
Inventor
Harry M. Pflager
By Rodney Bedell
Attorney

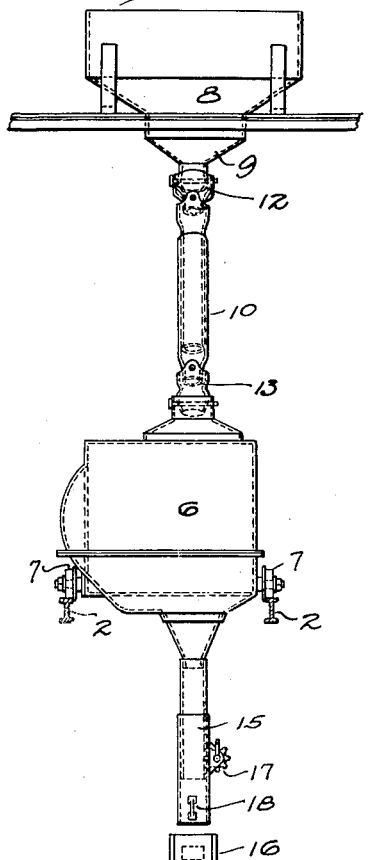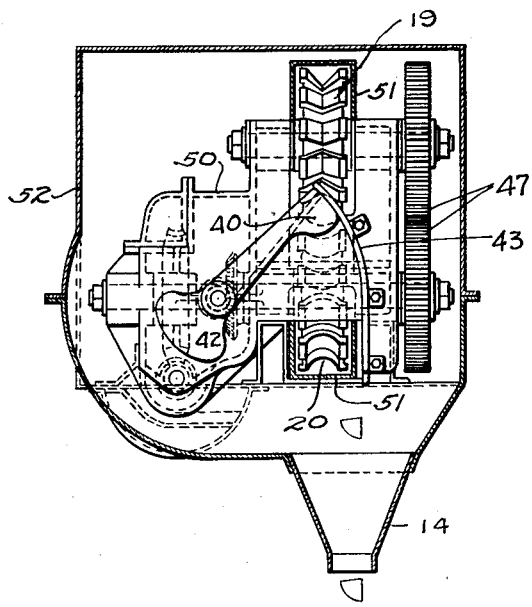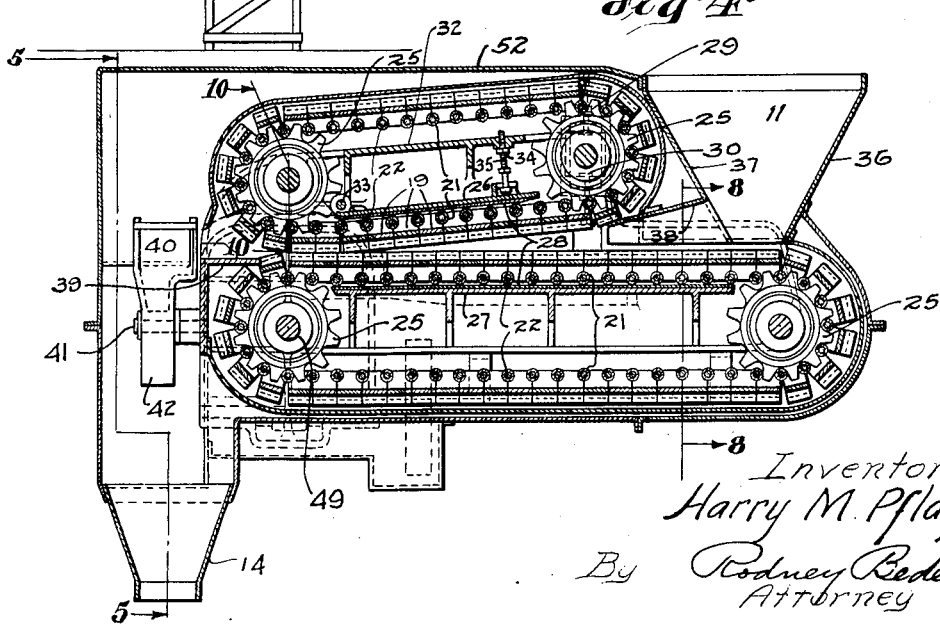

Oct. 24, 1933. H. M. PFLAGER 1,932,023
MOLDING APPARATUS
Filed Feb. 19, 1930 4 Sheets-Sheet 3
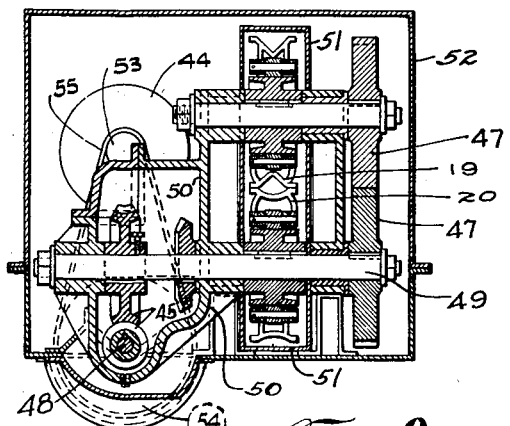
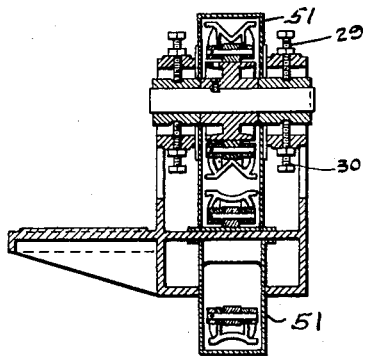
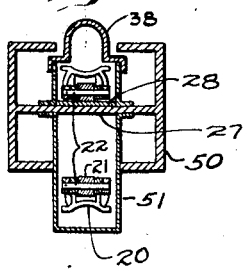
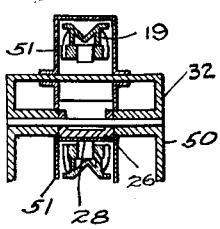
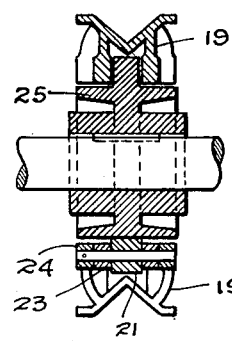
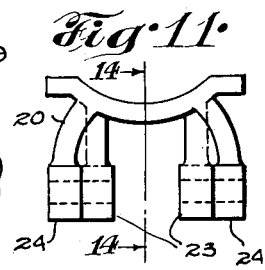
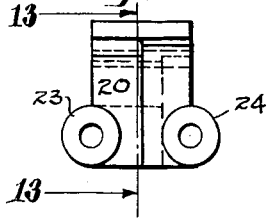
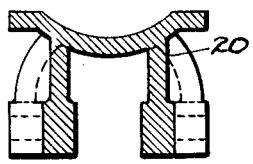
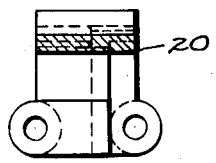
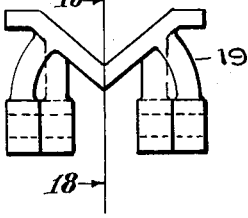
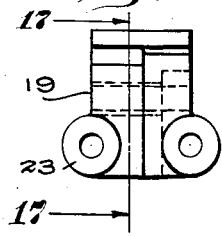
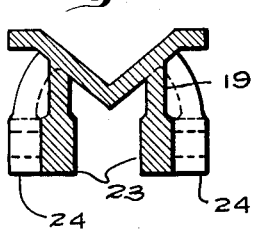
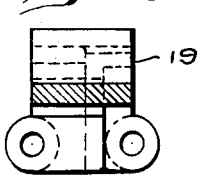
Inventor
Harry M. Pflager
By Rodney Bedell
Attorney Oct. 24, 1933.  H. M. PFLAGER  1,932,023
MOLDING APPARATUS
Filed Feb. 19, 1930  4 Sheets-Sheet 4

Inventor
Harry M. Pflager
By Rodney Bedell
Attorney

Patented Oct. 24, 1933

1,932,023

UNITED STATES PATENT OFFICE 1,932,023

MOLDING APPARATUS

Harry M. Pflager, St. Louis, Mo., assignor to General Steel Castings Corporation, Granite City, Ill., a corporation of Delaware Application February 19, 1930. Serial No. 429,712

9 Claims. (Cl. 22—36)

My invention relates to the art of foundry molding and more particularly to the preparation of sand and its application to the mold. It has been recognized that the compacting of molding sand by machinery, or otherwise, prior to its application to the mold, facilitates the packing or ramming of the sand in the mold and different devices and methods have been proposed for this purpose.

My present invention relates to a novel machine and associated structure for compacting substantial quantities of slugs of mold sand and distributing them to the mold. My invention has been developed in connection with the preparation of molds for large castings, such as railway car platforms, underframes, locomotive beds and similar castings where the total length is many feet and it is impractical to reach all parts of the mold by an ordinary pivoted chute leading from a stationary slug-forming machine.

The more detailed objects of my invention, and the constructions by which these objects are attained, are referred to in detail in the specification below.

In the accompanying drawings which illustrate my invention and particularly a selected embodiment thereof—

Figure 1 is an elevation of an upright post which may form a part of a foundry building, a boom thereon and a sand slug machine carried thereby, a portion of the loose sand reservoir from which sand is supplied to the machine and the sand supply line to the machine, the slug discharge line from the machine, and a flask or core box.

Figure 2 is a similar elevation taken at right angles to Figure 1.

Figure 3 is a top view of the sand slug machine with the top plate removed.

Figure 4 is a longitudinal vertical section through the machine taken on the line 4—4 of Figure 3.

Figure 5 is a view of the front of the machine with the cover plate removed.

Figures 6, 7, 8, 9 and 10 are vertical transverse sections taken on the corresponding section lines of Figures 3 and 4.

Figure 11 is an end view and Figure 12 is a side view of one of the lower conveyor links.

Figures 13 and 14 are, respectively, transverse and longitudinal sections through the links shown in Figures 11 and 12.

Figures 15 to 18, inclusive, are similar views illustrating one of the upper conveyor links.

Figure 19:
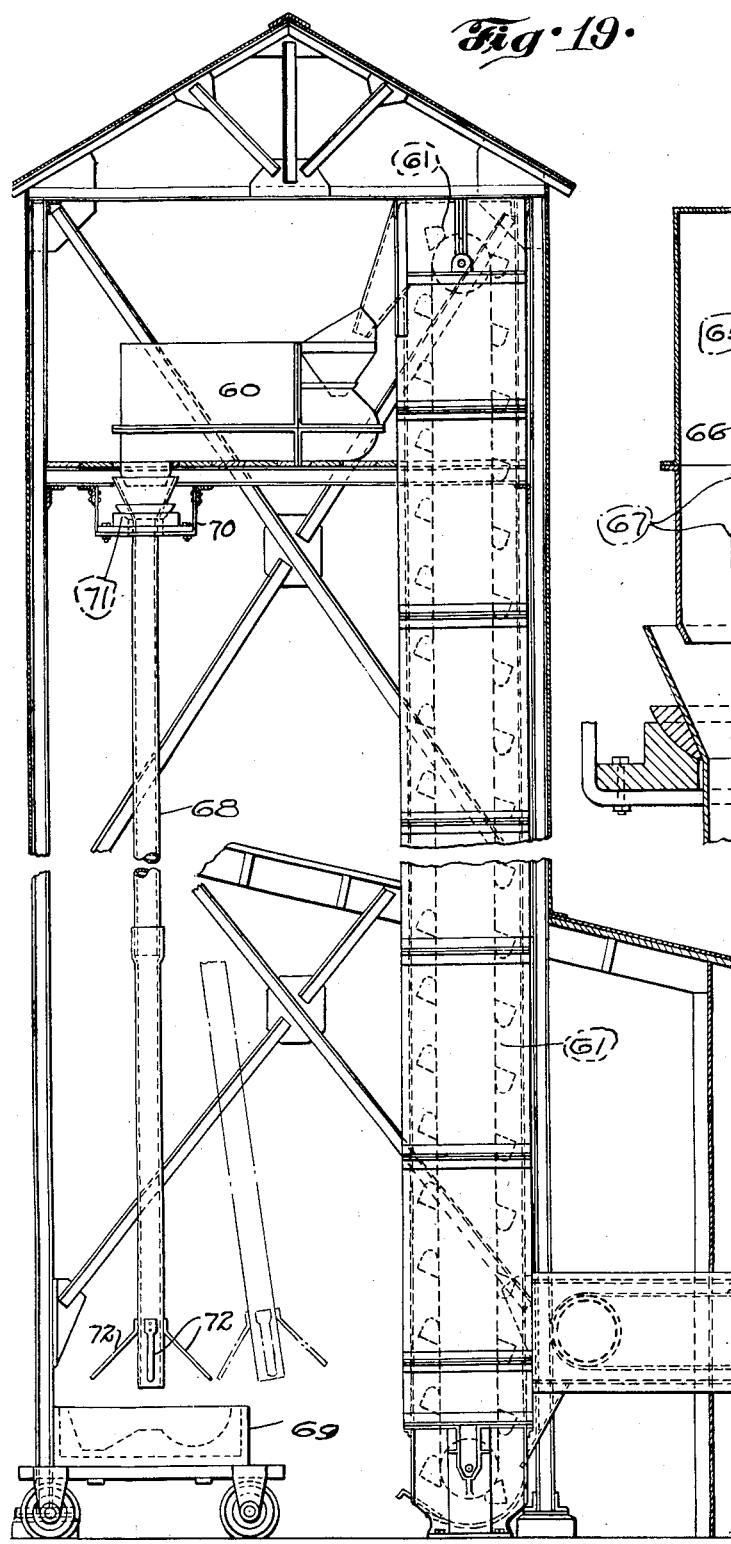

Figure 19 is an elevation of a foundry structure illustrating a modification of my invention.

Figure 20:
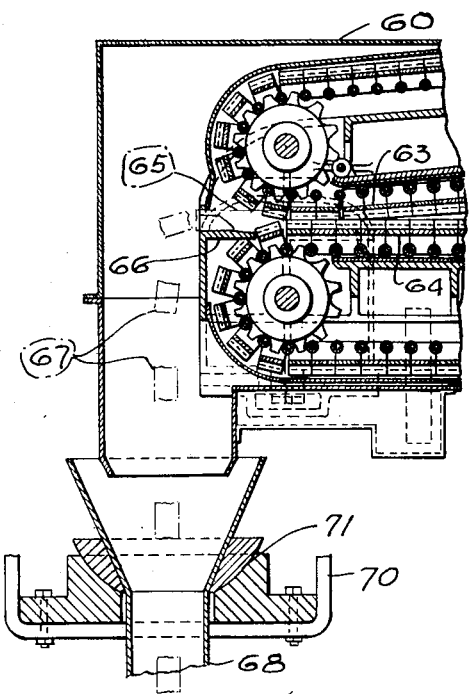

Figure 20 is a fragmentary detail of the machine and discharge chute inlet of the modified structure.

Referring to Figures 1 and 2, 1 indicates an upright post having a horizontal boom pivoted thereto, as indicated at 3, and comprising a pair of spaced rails 2. Braces 4, connected to the outer end of the boom and pivoted to the post at 5, contribute to the support of the boom and its load. The slug-forming machine proper is indicated at 6 and is mounted upon the boom by means of wheels 7 so as to travel to and from post 1. The lower end of a sand reservoir 8 is located at a substantial height above the boom and is provided with a discharge member 9 and a telescoping pipe 10 connects the reservoir discharge member with the upper end of the slug machine hopper 11. Universal joints 12 and 13, between piping 10 and the sand reservoir and the hopper, respectively, provide for the movement of the machine along the boom and for the swinging of the boom and the machine without interfering with the sand supply. A slug discharging chute 14 leads from the outer end of the machine 6 and is provided with a telescoping extension 15 whereby the slug may be directed to different parts of a flask or core box 16 irrespective of the height or extent of the latter. A rack and cog wheel 17 and handles 18 facilitate the manipulation of the slug discharge chute.

Referring to the detailed illustrations of the machine, it will be seen that the latter comprises two conveyor systems each having a series of links which, throughout a substantial portion of their movement, travel in a path converging towards a series of links of the other conveyor system. The links 19 of the upper system are detailed in Figures 15 to 18 and the links 20 of the lower system are detailed in Figures 11 to 14. These links are substantially alike except for the contour of their sand-receiving surfaces and the details of links 19, aside from their sand-receiving surface, correspond to the details of links 20. Links 20 have arcuate sand-receiving surfaces and links 19 have angular sand-receiving surfaces.

The links of each conveyor are interconnected by means of pins 22 seated in the overlapping lugs 23 and 24, respectively, of two adjacent links, each link having the more narrowly spaced lugs 23 at one end and the more widely spaced lugs 24 at the other end.

A roller 21 is mounted on each pin 22 intermediate lugs 23 and these rollers support the conveyor links in their travel over sprockets 25 and rigid backing plates 26 and 27 extending between sprockets 25 on the side of each conveyor adjacent to the other conveyor. Preferably, each of the backing plates 26 and 27 is provided with a wear plate 28 which may be of harder material, if desired, and may be renewed at intervals so as to maintain the desired elevation of the conveyor links.

The right-hand sprocket 25 of the upper conveyor is adjustable vertically by means of screws 29 and 30 and thereby the distance between the conveyors at the right-hand end of the upper conveyor may be varied and, accordingly, the angle between the two opposing series of links. Backing plate 26 is pivoted to the frame 32, as indicated at 33, and may be adjusted by means of nut 34 and screw 35 following the adjustment of the right-hand sprocket 25 of the upper conveyor.

The lower end of hopper 11 has converging side walls 36 and 37 of which wall 37 has its lower portion inclined downwardly and outwardly as indicated at 38 to provide a relatively long and narrow outlet for the sand passing from the hopper to the conveyor. This arrangement facilitates the passage of the sand and tends to insure an even distribution of the same to the conveyor links.

At the discharge end of the conveyor, I provide a stationary shelf 39 having its inner edge so aligned with the links of the lower conveyor that the bar of sand formed by the conveyors will ride onto the shelf and will be projected therefrom into the path of a rotating arm or hammer 40.

This arm is mounted on a shaft 41 and is provided with a counterweight 42 and is rotated at comparatively high speed. At each rotation its outer end strikes the projecting portion of the bar of sand, cutting off a slug from the remainder of the bar and batting it downwardly through the discharge chute 14 which guides the slug into the mold. Cooperating with the end of arm 40 is a guard 43 which has its upper end curved to correspond to the path described by the outer end of arm 40 and has its lower end arranged at a tangent to the curved portion at the point on the latter where the arm begins to move inwardly from the downward path which it is desired that the slug travel. The angle between guard 43 and arm 40, when the latter is in the position shown in Figure 5, corresponds to the angle formed by the sides of the V-shaped sand-carrying surfaces of links 19. Hence, there is little or no tendency on the part of the arm and guard to change the shape of the sand slug and it is discharged from the machine with its degree of compactness substantially undisturbed.

The conveyor systems and the rotating arm are driven by suitable mechanism including the motor 44 having a shaft pulley 53 and a belt connection 55 to a pulley 54 on a countershaft 48 which rotates the main shaft 49 through a worm and wheel reduction gear 45. 46 indicates a bevel gearing by which the arm shaft 41 is driven from the main shaft 49, and 47 indicates spur gearing by which the upper conveyor sprocket 25 is driven from the main shaft 49 on which the lower conveyor sprocket 25 is mounted.

The machine frame 50 forms a housing enclosing gearing 45 and 46 thereby protecting these mechanisms from injury due to sand reaching the same. Also, the housing is adapted to contain oil or grease for lubricating the bearings and gearing. Further protection is afforded by the use of housing members 51 about the conveyor systems and substantially enclosing the same except for suitable openings where the sand is admitted from the hopper 11 and where the slugs are discharged from shelf 39. An additional housing 52 encloses the entire machine except for the hopper opening and the discharge chute 14.

In the modification illustrated in Figures 19 and 20 I eliminate the rotating hammer and substitute the force of gravity for the purpose of breaking off the slug at the end of the bar of sand and for imparting velocity to the slug as it enters the flask or core-box.

In this structure the sand slug machine 60 is stationary and is located near the top of a building or tower at an elevation of approximately sixty feet or more and sand is supplied to the same by a bucket conveyor 61 which is fed by a conveyor belt 62. The conveyor systems of the machine itself are indicated at 63 and 64 and are substantially the same as those previously described. The bar of sand 65 is projected over and beyond the shelf 66 at the end of the lower conveyor 64 and, when projected a sufficient distance, the end portion breaks off to form the slugs 67 which drop through the chute 68 into the core-box 69 or a flask similarly located.

The chute is suspended from a bracket 70 by means of a ball and socket joint 71 whereby its discharge end may be moved manually by handles 72 to any desired point within the area of the core-box or flask.

By means of either device described above, a mass of loose sand may be fed to the machine and discharged at high velocity to the mold or core-box in a continuous stream of compact slugs whereby the flask or core-box is rapidly filled with sand compacted to an extent which eliminates much of the ramming work, and a mold is provided in which the degree of compactness is substantially uniform throughout, irrespective of carelessness or lack of skill on the part of the workman preparing the mold.

Obviously, many of the details of the described structure may be varied in other ways than indicated above and some may be omitted, if desired, without departure from the spirit of my invention and I contemplate the exclusive use of such modifications as come within the scope of my claims.

I claim:

1. In a sand slug machine, a conveyor, and a hopper above said conveyor for feeding sand thereto, the discharge end of said hopper including top and side walls extending laterally and downwardly from the lower portion of the hopper to enlarge the discharge opening in the direction of the length of said conveyor and over the same to facilitate the charging of said conveyor with loose sand.

2. In a sand slug machine, a conveyor, and a sand feeding hopper above said conveyor comprising a body portion with opposite side walls converging to form the narrowest portion of the body at a point spaced above said conveyor, two of said side walls extending downwardly to the conveyor and another of said side walls being inclined downwardly and outwardly and extending between said two side walls and along said conveyor to provide an elongated lower end of said hopper to facilitate the discharge of loose sand to said conveyor through a relatively long and narrow area.

3. In a sand slug machine, a sand hopper, a discharge element, a pair of relatively inclined conveyor devices each having a series of rigid links concave in cross section with open ends, said devices being arranged with substantial portions of their concave elements justaposed and facing each other and forming an elongated tapering rigid mold with its larger end near said hopper and its smaller end near said discharge element.

4. In combination, a sand reservoir, a sand slug machine below said reservoir and movable horizontally relative thereto and having a discharge chute, and a supply pipe from said reservoir to said machine and having universal joint connections to said reservoir and said machine.

5. In combination, a sand reservoir, a sand slug machine below said reservoir and movable horizontally relative thereto and having a discharge chute, and a supply pipe comprising rigid sections telescopically assembled and extending from said reservoir to said machine and having universal joint connections to said reservoir and said machine.

6. In combination, an elevated sand reservoir, an upright post, a boom pivoted to swing horizontally about said post and beneath said reservoir, a sand slug machine movable along said boom and having a discharge chute, and a supply pipe from said reservoir to said machine automatically adjustable to accommodate different relative positions of said reservoir and machine.

7. In combination, an elevated sand reservoir, an upright post, a boom pivoted to swing horizontally about said piston and beneath said reservoir, a sand slug machine including an enclosing housing with inlet hopper and discharge chute, wheels supporting said machine and housing on said boom so that said machine may be moved along said boom, and a discharge chute and a supply pipe from said reservoir to said machine and automatically adjustable to accommodate different relative positions of said reservoir machine.

8. A sand slug machine as specified in claim 3 in which an individually mounted rigid backing member is provided for the series of links of each of the conveyor devices.

9. A sand slug machine as specified in claim 3 in which an individually mounted backing member having a renewable wear plate is provided for the series of links of each of the conveyor devices.

H. M. PFLAGER.